(12) United States Patent
Heath et al.

(10) Patent No.: US 11,467,391 B2
(45) Date of Patent: Oct. 11, 2022

(54) UNITARY CARRIER FOR HOLOGRAPHIC COMPONENTS

(71) Applicant: EOTECH, LLC, Ann Arbor, MI (US)

(72) Inventors: Anthony Heath, Ypsilanti, MI (US); Deanna Kay McMillen, Ann Arbor, MI (US); James Olson, Saline, MI (US)

(73) Assignee: EOTech, LLC, Plymouth, MI (US)

( * ) Notice: Subject to any disclaimer, the term of this patent is extended or adjusted under 35 U.S.C. 154(b) by 182 days.

(21) Appl. No.: 16/691,117

(22) Filed: Nov. 21, 2019

(65) Prior Publication Data

US 2021/0157119 A1    May 27, 2021

(51) Int. Cl.
*F41G 1/30* (2006.01)
*G02B 23/10* (2006.01)
*G03H 1/00* (2006.01)

(52) U.S. Cl.
CPC ............ *G02B 23/105* (2013.01); *F41G 1/30* (2013.01); *G03H 1/0005* (2013.01); *G03H 2222/12* (2013.01); *G03H 2222/53* (2013.01); *G03H 2223/23* (2013.01); *G03H 2223/24* (2013.01); *G03H 2227/03* (2013.01); *G03H 2270/31* (2013.01)

(58) Field of Classification Search
CPC ...... G02B 23/105; G02B 5/32; G03H 1/0005; G03H 2223/23; G03H 2227/03; G03H 2222/53; G03H 2270/31; F41G 1/30; F41G 1/14
USPC ........... 359/15, 1; 33/233, 241; 42/100, 101, 42/115
See application file for complete search history.

(56) References Cited

U.S. PATENT DOCUMENTS 3,994,597 A     11/1976  Calder et al.
4,191,471 A     3/1980   Courten
(Continued)

FOREIGN PATENT DOCUMENTS

EP      2943736 B1   10/2017
ES      2672007 T3    6/2018
(Continued)

OTHER PUBLICATIONS

International Search Report for Application No. PCT/US2020/060714 dated Jun. 21, 2021; 2 pp.
(Continued)

*Primary Examiner* — Audrey Y Chang
(74) *Attorney, Agent, or Firm* — Bodman PLC

(57) ABSTRACT

A holographic sight comprises a unitary optical component carrier. The unitary optical component carrier may comprise a body with a first receptacle configured to receive a laser diode, a second receptacle configured to receive a mirror, a third receptacle configured to receive a collimating optic, a fourth receptacle configured to receive a grating, and a fifth receptacle configured to receive an image hologram. A laser diode may be received within opposing walls formed by the first receptacle. A mirror may be received in, and abut one or more surfaces of the second receptacle. A collimating optic may be received in, and abut one or more surfaces of the third receptacle. A grating may be received in, and abut one or more surfaces of the fourth receptacle. A hologram image may be received in, and abut one or more surfaces of the fifth receptacle.

20 Claims, 17 Drawing Sheets

(56) References Cited

U.S. PATENT DOCUMENTS

| | | | |
|---|---|---|---|
| 4,592,654 A | 6/1986 | Girault | |
| 4,940,324 A | 7/1990 | Nichols | |
| 5,090,805 A | 2/1992 | Stawarz | |
| 5,134,798 A | 8/1992 | Lee | |
| 5,369,888 A * | 12/1994 | Kay | F41G 1/30 356/252 |
| 5,383,278 A | 1/1995 | Kay | |
| 5,483,362 A | 1/1996 | Tai et al. | |
| 5,508,843 A | 4/1996 | Tomita | |
| 5,815,936 A * | 10/1998 | Sieczka | G03H 1/0005 42/114 |
| 6,000,667 A | 12/1999 | Isbell et al. | |
| 6,490,060 B1 * | 12/2002 | Tai | G02B 5/32 359/15 |
| 7,145,703 B2 | 12/2006 | Sieczka et al. | |
| 7,225,578 B2 | 6/2007 | Tai | |
| 7,784,192 B2 | 8/2010 | Jancic et al. | |
| 7,872,747 B2 | 1/2011 | Gerlach | |
| 8,056,245 B2 | 11/2011 | Cranton et al. | |
| 8,087,196 B2 | 1/2012 | Jung et al. | |
| 8,156,679 B1 | 4/2012 | Swan | |
| 8,186,093 B1 | 5/2012 | Chung | |
| 8,240,075 B1 | 8/2012 | Mullin | |
| 8,296,991 B1 | 10/2012 | Chung | |
| 8,671,611 B2 | 3/2014 | Ostergren et al. | |
| 9,057,584 B2 | 6/2015 | Chung | |
| 9,500,442 B2 | 11/2016 | Collin et al. | |
| 10,095,089 B2 | 10/2018 | Po et al. | |
| 10,247,515 B2 | 4/2019 | Collin | |
| 10,254,532 B2 | 4/2019 | Collin | |
| 10,267,597 B2 | 4/2019 | Olmstead et al. | |
| 10,345,077 B1 | 7/2019 | Loebig et al. | |
| 10,345,587 B1 | 7/2019 | Loebig et al. | |
| 10,591,249 B2 | 3/2020 | Campbell | |
| 10,704,862 B2 | 7/2020 | Chung | |
| 10,801,813 B2 | 10/2020 | Moseman et al. | |
| 2003/0074824 A1 | 4/2003 | Arachequesne | |
| 2006/0265930 A1 | 11/2006 | Woodbury | |
| 2008/0020355 A1 | 1/2008 | Young | |
| 2008/0216379 A1 | 9/2008 | Javorsky | |
| 2009/0116231 A1 | 5/2009 | Miller | |
| 2009/0193705 A1 | 8/2009 | LoRocco | |
| 2010/0162611 A1 | 7/2010 | Samson et al. | |
| 2011/0228366 A1 * | 9/2011 | Liu | G02B 23/14 359/15 |
| 2013/0008072 A1 | 1/2013 | Chung | |
| 2014/0237884 A1 | 8/2014 | Koesler | |
| 2014/0305022 A1 | 10/2014 | Chung | |
| 2014/0317988 A1 | 10/2014 | Battis et al. | |
| 2015/0198415 A1 | 7/2015 | Campean | |
| 2015/0267997 A1 | 9/2015 | Collin et al. | |
| 2016/0003996 A1 | 1/2016 | Dehmlow et al. | |
| 2016/0033232 A1 | 2/2016 | Cheng | |
| 2016/0102943 A1 | 4/2016 | Teetzel et al. | |
| 2016/0161735 A1 * | 6/2016 | Armbruster | F41G 1/14 359/15 |
| 2016/0313089 A1 | 10/2016 | Collin et al. | |
| 2016/0327365 A1 | 11/2016 | Collin et al. | |
| 2016/0377378 A1 | 11/2016 | Collin et al. | |
| 2016/0377377 A1 * | 12/2016 | Collin | G02B 5/32 42/113 |
| 2017/0205194 A1 | 7/2017 | Teetzel et al. | |
| 2018/0292168 A1 | 10/2018 | Borrico | |
| 2019/0072702 A1 | 3/2019 | Voloschenko et al. | |
| 2019/0145733 A1 | 5/2019 | Chung | |
| 2019/0277600 A1 | 9/2019 | Larsson | |
| 2019/0346235 A1 | 11/2019 | Sidelkovsky | |
| 2020/0011640 A1 | 1/2020 | Moseman et al. | |
| 2020/0141700 A1 | 5/2020 | Moseman et al. | |
| 2020/0240748 A1 | 7/2020 | Connolly | |
| 2020/0272044 A1 | 8/2020 | Walker | |
| 2021/0156645 A1 | 5/2021 | Heath | |
| 2021/0156646 A1 | 5/2021 | Schulte et al. | |
| 2021/0157086 A1 | 5/2021 | Heath et al. | |
| 2021/0157267 A1 | 7/2021 | Heath | |
| 2022/0065583 A1 | 3/2022 | Heath et al. | |

FOREIGN PATENT DOCUMENTS

| | | |
|---|---|---|
| JP | 4019995 B2 | 12/2007 |
| JP | 2008090257 A | 4/2008 |
| KR | 101375457 B1 | 3/2014 |
| RU | 2582900 C1 | 4/2016 |
| WO | 1995031740 A1 | 11/1995 |
| WO | 2019068165 A1 | 4/2019 |
| WO | 2020250758 A1 | 12/2020 |
| WO | 2021141669 A1 | 7/2021 |
| WO | 2021141670 A2 | 7/2021 |
| WO | 2021141671 A1 | 7/2021 |

OTHER PUBLICATIONS

International Search Report for Application No. PCT/US2020/060719 dated Aug. 20, 2021; 2 pp.

International Search Report for Application No. PCT/US2020/060695 dated May 21, 2021; 2 pp.

International Search Report for Application No. PCT/US2020/060707 dated Sep. 24, 2021; 2 pp.

* cited by examiner

UNITARY CARRIER FOR HOLOGRAPHIC COMPONENTS

BACKGROUND

Identifying and focusing on an object located at a distance may be facilitated by use of a sight. A sight may be employed, for example, with small arms such as bows, rifles, shotguns, handguns, mounted machine guns, and grenade launchers, etc., and may assist an operator to locate and maintain focus on a target.

Sights have been developed in many different forms and utilizing various features. For example, sights have been developed that present the operator with a hologram which may assist the operator with locating and focusing on an object.

SUMMARY

Disclosed herein is a holographic sight comprising a unitary optical component carrier. The unitary optical component carrier may comprise a single body with a plurality of receptacles for receiving optical components configured to generate a hologram. For example, the unitary optical component carrier may comprise a first receptacle configured to receive a laser diode, a second receptacle configured to receive a mirror, a third receptacle configured to receive a collimating optic, a fourth receptacle configured to receive a grating, and a fifth receptacle configured to receive an image hologram. Each of the receptacles may comprise a plurality of surfaces against which the corresponding optical component may be positioned. Light may be communicated from the laser diode to the image hologram via the mirror, collimating optic, and the grating. The unitary optical component carrier provides mechanical stability and maintains the relative positioning of the optical components received in the plurality of receptacles.

The unitary optical component carrier may be integrally formed with a support member that extends upward from a base. The support member may be flexible, and the unitary optical component carrier may be moveable in horizontal and vertical directions relative to the base. The support member may comprise a first portion extending upward relative to the base, a second portion extending away from the unitary optical component carrier, a third portion extending toward and integrally formed with the unitary optical component carrier, and a joint formed between the second and third portion. The first portion may be flexible and the unitary optical component carrier angularly moveable, with the first portion serving as a fulcrum, in a horizontal direction relative to the base. When horizontal pressure is applied to the unitary optical component carrier, the unitary optical component carrier may be angularly displaced horizontally with the first portion of the support member serving as a fulcrum. The joint between the second and third portions may be flexible and the unitary optical component carrier angularly moveable, with the joint serving as a fulcrum, in a vertical direction relative to the base. When vertical pressure is applied to the unitary optical component carrier, the unitary optical component carrier may be angularly displaced vertically with the joint portion serving as a fulcrum. The mechanical stability of the unitary optical component carrier maintains the relative positioning of the optical components during displacement.

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter. Other features are described herein.

BRIEF DESCRIPTION OF THE DRAWINGS

The foregoing summary and the following additional description of the illustrative embodiments may be better understood when read in conjunction with the accompanying exemplary drawings. It is understood that the potential embodiments of the disclosed systems and implementations are not limited to those depicted. Furthermore, like reference numerals in the figures indicate like elements.

DETAILED DESCRIPTION

Figure 1A:
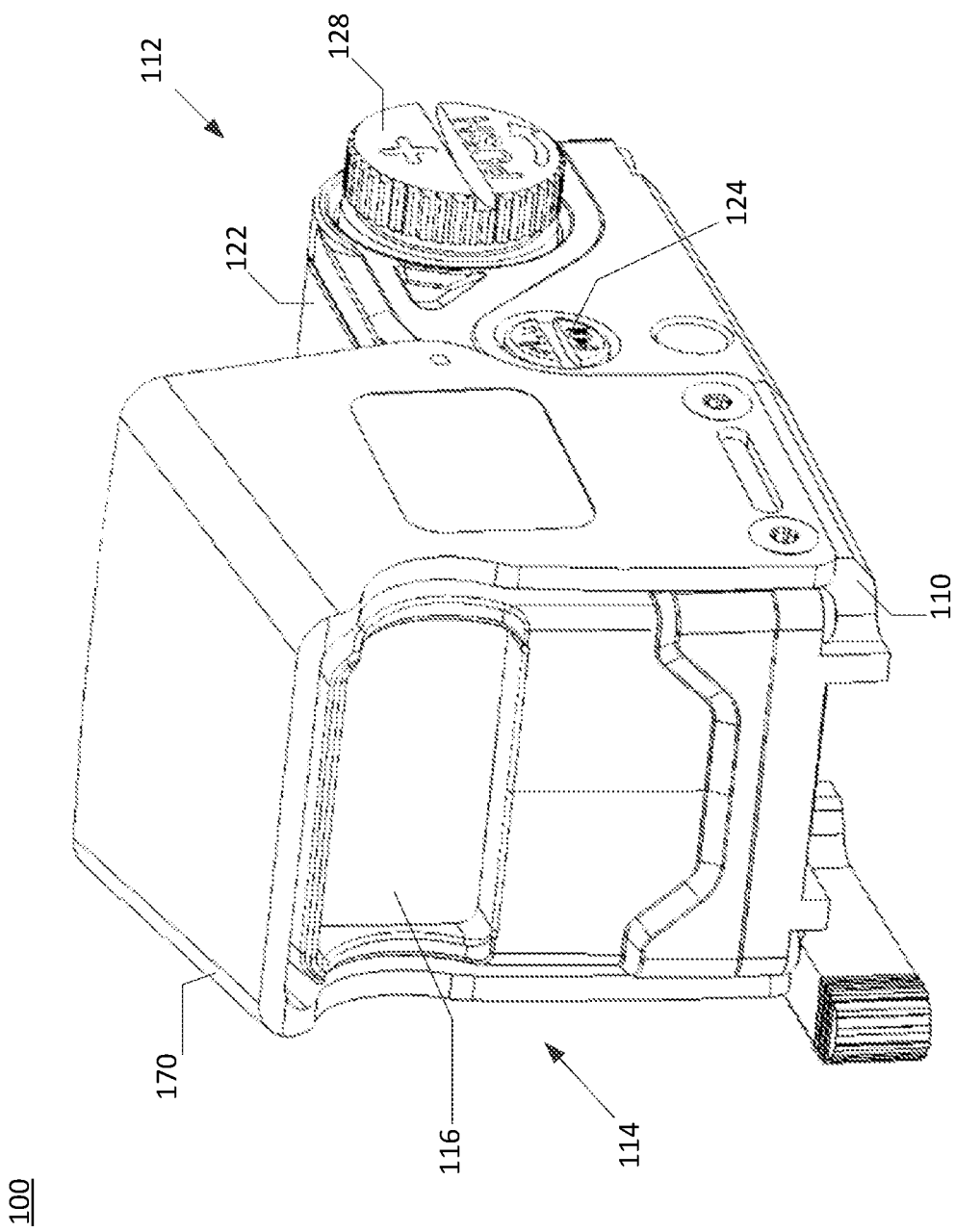
FIGS. 1A, 1B, 1C, and 1D depict perspective views of an example assembled holographic sight.

Holographic sights may employ a series of optical components to generate a hologram for presentation to the operator. For example, a holographic sight may employ a laser diode that generates a light beam, a mirror that deflects the light beam, a collimating optic that receives the deflected light beam and directs collimated light, a grating that receives the collimated light and reflects light toward an image hologram that has been recorded with an image and which displays the image to the operator of the sight. Operation of the holographic sight requires that the optical components be in the intended relative positions, including distance and orientation, relative to each other. Even small variances from the intended position of even one of the optical components may negatively impact the generation of a hologram for use by the operator of the sight.

Holographic sights may position optical components relative to each other by affixing them to structures in a holographic sight. For example, optical components such as, for example, the collimating optic and the hologram image may be affixed to an interior of a holographic sight housing. The mirror may be positioned on a podium extending from a base to which the sight housing is attached. The grating may be affixed to a moveable plate configured to rotate relative to the sight housing. Because the optical components are attached to different components which themselves may be moveable relative to each other, it may be difficult to place the optical components in their intended positions even in a controlled manufacturing environment. Furthermore, movement of any of the structures to which the optical components are attached may move the optical components from their intended positions causing degradation in the reconstruction of the hologram. For example, in a scenario the housing to which the collimating optic and hologram are attached receives an external blow, the housing and the optical components attached to it may be moved by the external blow from their intended positions which may degrade the quality of the hologram.

The structures to which the optical components are attached may be made from different materials and may react differently to changes in temperature. For example, the holographic sight housing to which a collimating optic and hologram image may be attached may be made of steel and the podium to which the mirror component may be attached may be made from aluminum. Steel and aluminum may expand and contract in response to temperatures changes at different rates. The optical components attached to the structures, due to the different rates of thermal expansion and contraction, may be displaced from their intended positions which may degrade the quality of the hologram.

Applicant discloses herein a holographic sight that employs a unitary optical component carrier. The unitary optical component carrier may comprise a body with a plurality of receptacles that are configured to receive optical components therein and to maintain the relative position of the optical components. The unitary optical component carrier may comprise a first receptacle configured to receive a laser diode, a second receptacle configured to receive a mirror, a third receptacle configured to receive a collimating optic, a fourth receptacle configured to receive a grating, and a fifth receptacle configured to receive an image hologram. The unitary optical component carrier may be mechanically stable, and the optical components received therein may be maintained in their intended relative positions. Displacement of the optical components due to displacement of separate receiving structures is eliminated. The unitary optical component carrier may be made of a material that has a low coefficient of thermal expansion (CTE) and may, therefore, be resistant to displacement of the optical components due to changes in temperature.

Figure 1B:
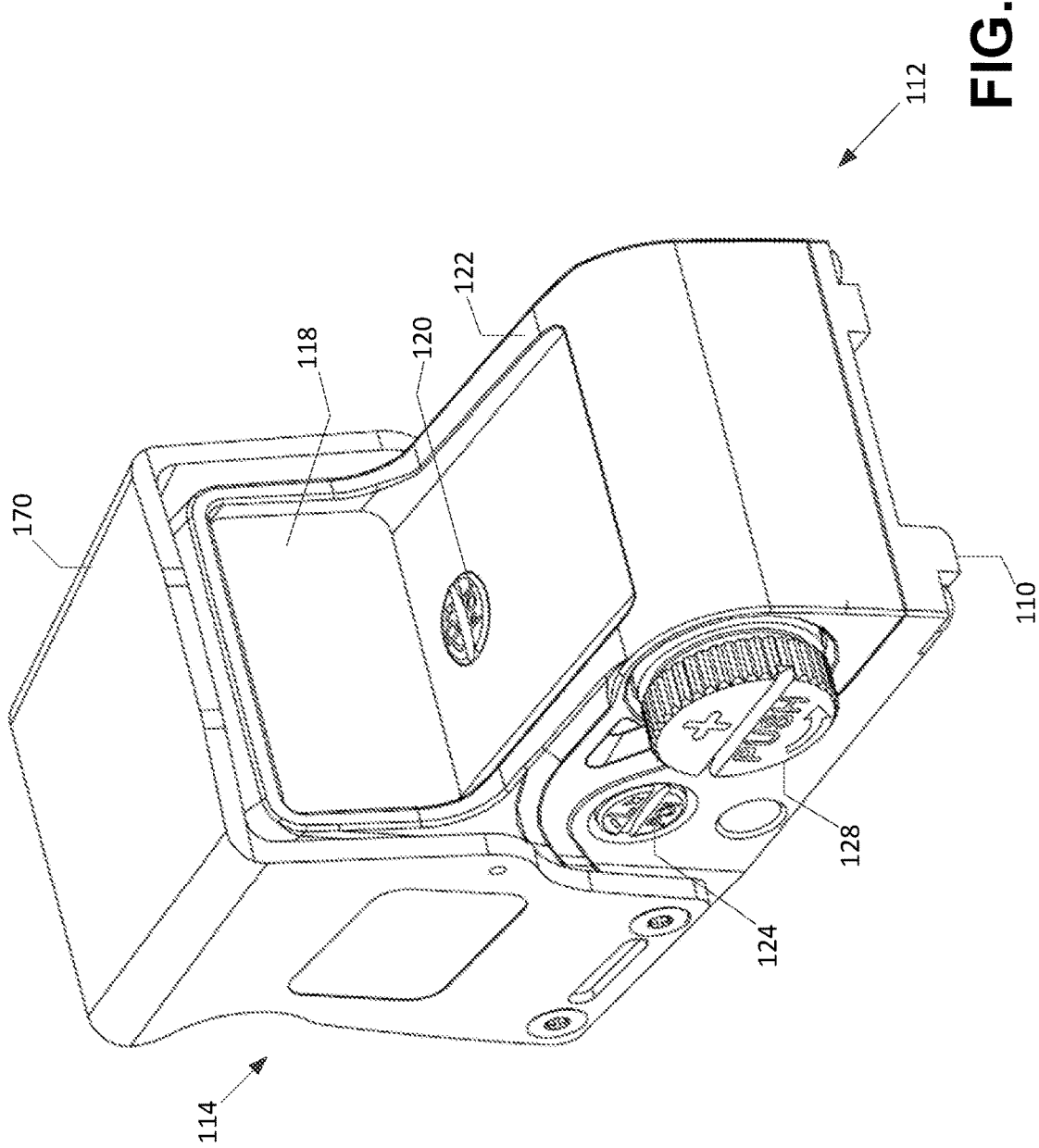
Figure 1C:
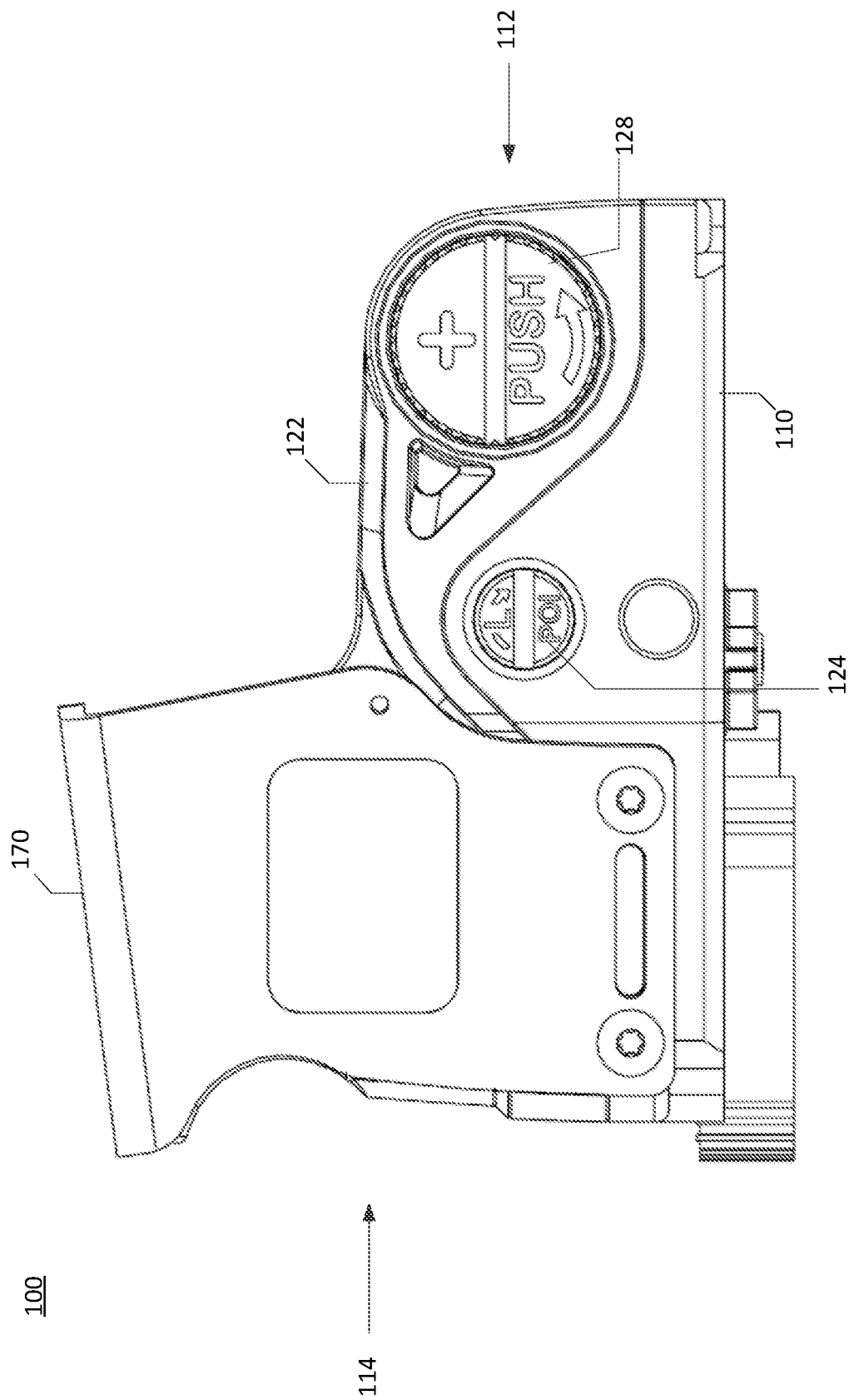
Figure 1D:
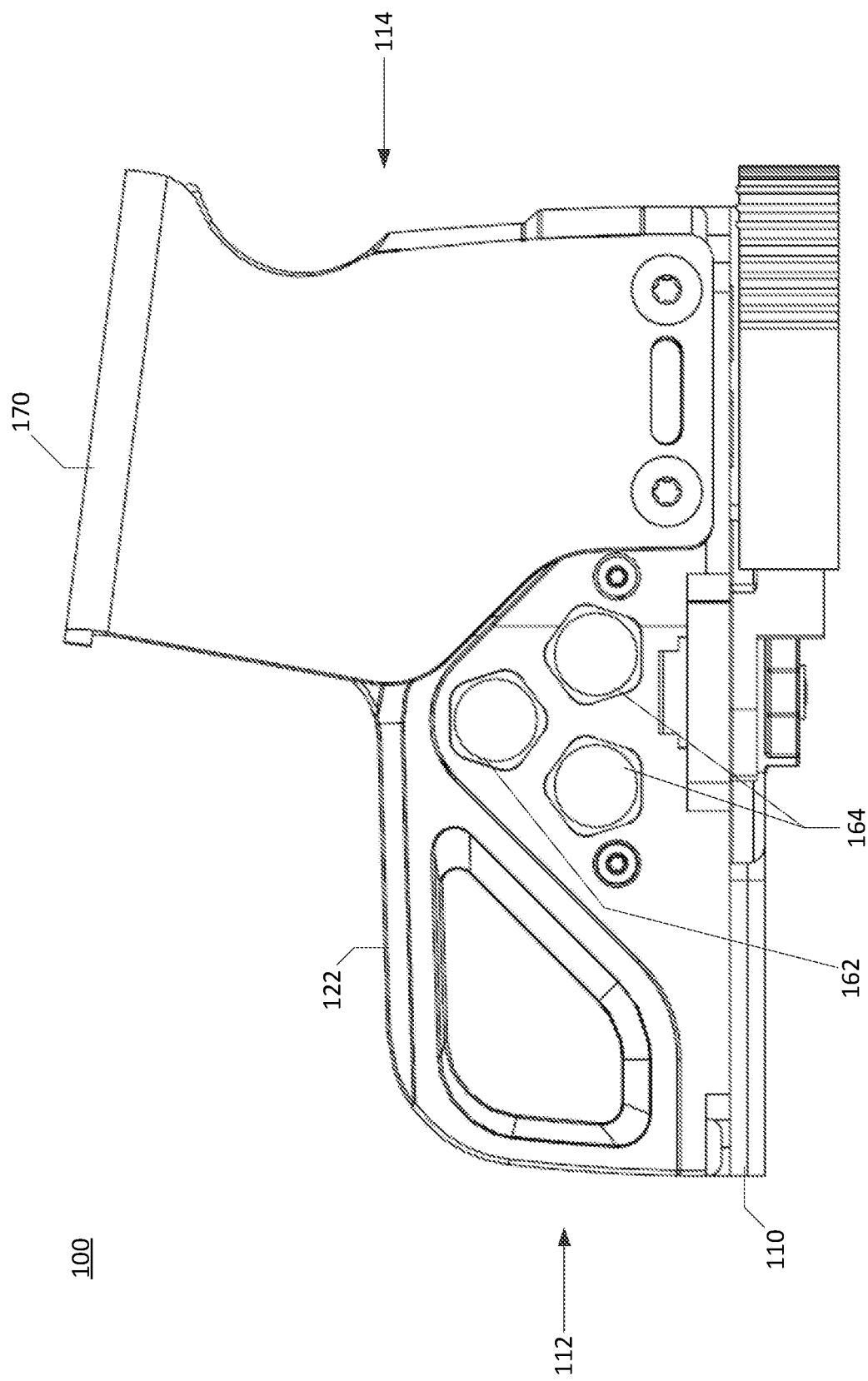

FIGS. 1A and 1B depict front and rear views, respectively, of an example holographic sight 100. FIGS. 1C and 1D depict side views of the example holographic sight 100. The holographic sight 100 may be adapted to be removably attached to a suitable device such as, for example, a firearm. The holographic sight 100 may comprise a base 110 that is configured to releasably engage with corresponding components on a firearm in order to secure the holographic sight 100 to the firearm.

The holographic sight 100 comprises a front end 112 and a rear end 114. An operator of the holographic sight 100 may look through a back window 116 situated at the rear end 114 and an aligned front window 118 situated at the front end 112. The area visible to the operator through the back window 116 and the aligned front window 118 may be referred to as a viewing area. The holographic sight 100 is adapted to impose a holographic image in the viewing area defined by the back window 116 and the front window 118.

An elevation adjustment control 120 may be accessible via an opening formed in a housing 122 of the holographic sight 100. An azimuth adjustment control 124 may be accessible via an opening formed in the base 110. An operator may turn the elevation adjustment control 120 to adjust the vertical location of the hologram as viewed from the back window 116. An operator may turn the azimuth adjustment control 124 to adjust the horizontal location of the hologram as viewed from the back window 116. A battery cap 128 may be removed to provide access to an opening configured to receive a battery which may provide electrical power to the holographic sight 100.

A night vision button 162 and up-down buttons 164 may extend through apertures formed in the base 110. An operator of the holographic sight may depress the night vision button 162 and/or the up/down buttons 164 to change the operating characteristics of the holographic sight 100. For example, depressing a particular button or combination of buttons may cause the holographic sight 100 to change its on/off state, change the brightness of the hologram, and/or toggle between normal and night vision modes The holographic sight 100 may further comprise a hood 170. The hood 170 may be positioned over and around a portion of the housing 122 and may be mechanically attached to the base 110. The hood 170 may be configured to protect the housing 122 from impacts.

Figure 2:
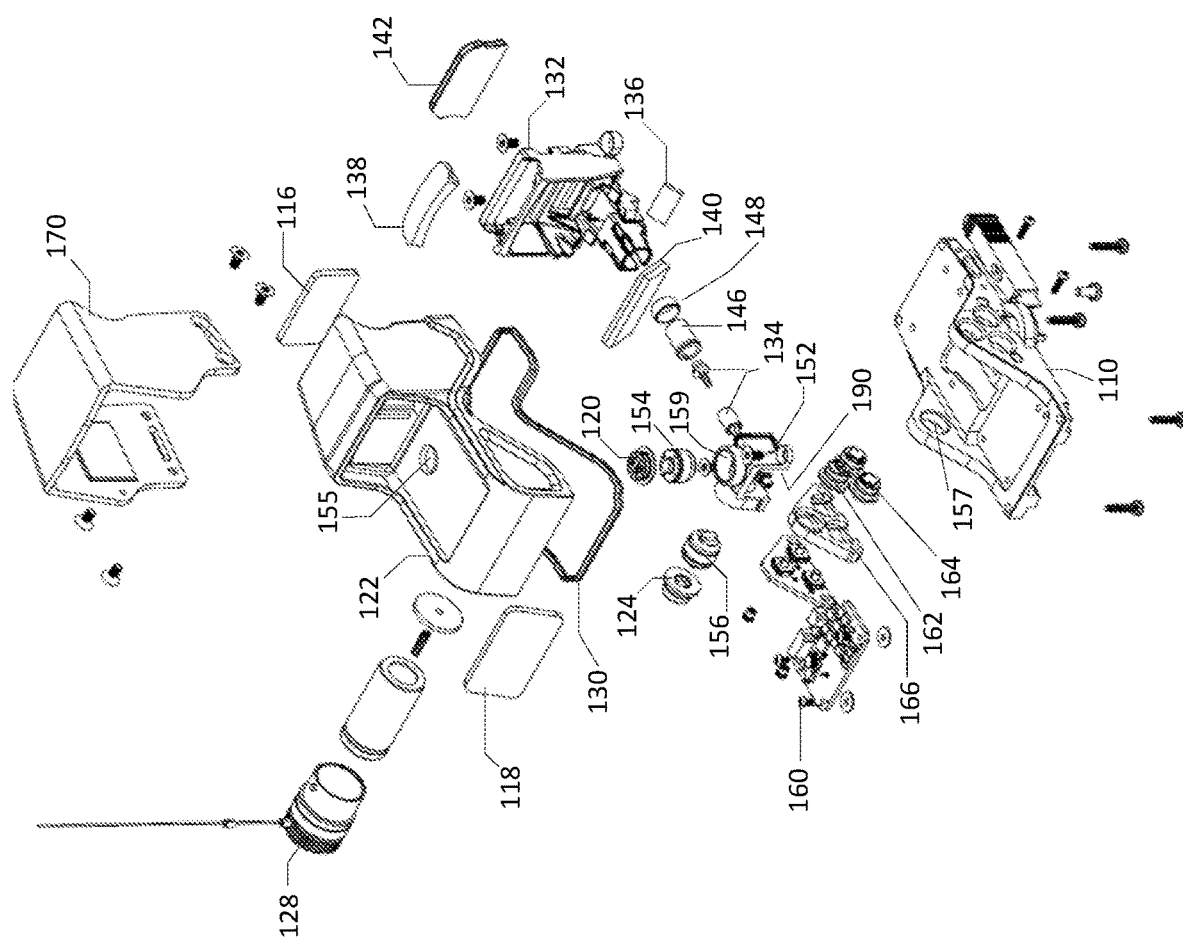
FIG. 2 is an exploded view of an example holographic sight.

FIG. 2 provides an exploded view of the holographic sight 100. The housing 122 may be mechanically coupled to the base 110 and may have a seal 130 positioned therebetween. The housing 122 envelopes components of the holographic sight 100. For example, the housing 122 may envelop an optical chassis 132 which may also be mechanically coupled to the base 110. The optical chassis 132 may comprise a rigid body with a plurality of receptacles for receiving optical components employed to create a holographic image. For example, the optical chassis 132 may comprise a body with receptacles for receiving each of a laser diode 134, a mirror 136, a collimating optic 138, a grating 140, and an image hologram 142. The laser diode 134 may be configured to generate visible light which is directed toward and received at the mirror 136. The mirror 136 may be configured to reflect light received from the laser diode 134 toward the collimating optic 138. The collimating optic 138 may be configured to receive reflected light from the mirror 136 and to direct collimated light to the grating 140. The collimating optic 138 may be, for example, transmissive or reflective. The grating 140, which may be, for example, a diffraction grating, may be configured to receive the collimated light from the collimating optic 138 and to reflect diffracted light toward the image hologram 142. The image hologram 142 may be configured to receive light from the grating 140 and project a hologram image which may be viewed in the viewing area of the holographic sight 100. The holographic sight 100 displays the hologram to the operator who looks through the viewing area presented by the rear window 116. The hologram image may be configured to assist an operator in locating and targeting an object. For example, the hologram may be a reticle, although other images may be employed.

A collar 146, which may be referred to as a laser diode shoe, may be formed in a cylindrical shape with an interior surface having an associated interior diameter and an exterior surface having an associated exterior diameter. The laser diode 134 may be positioned within the collar 146 and form a frictional fit with the interior surface of the collar 146. A ring 148 may be positioned around the exterior surface of the collar 146 and form a frictional fit with the exterior surface of the collar 146. The ring 148 is received within a corresponding receptacle of the optical chassis 132. The ring 148 may form a frictional fit with opposing walls comprised in the corresponding receptacle of the optical chassis 132. A laser diode hold press may be used to apply pressure to the collar 146 during insertion of the laser diode 134, the collar 146, and the ring 148 into the corresponding receptacle of the optical chassis 132.

The housing 122 further envelopes a bridge 152 which may be mechanically coupled to the base 110. The bridge 152 may form an opening 190 into which at least a portion of the first receptacle of the optical chassis 132 extends. An elevation adjuster assembly 154 and an azimuth adjuster assembly 156 may extend through openings 159 formed in the bridge 152 to engage portions of the first receptacle of the optical chassis 132. The elevation adjustment control 120 may engage with the elevation adjuster assembly 154 via an opening or aperture 155 formed in the housing 122. The opening or aperture 155 in the housing 122 may be formed to allow the elevation adjustment control 120 to engage with elevation adjuster assembly 154 without interference by the housing 122. An operator of the holographic sight 100 may turn the elevation adjustment control 120, which causes the elevation adjuster assembly 154 to increase or decrease the length of the assembly extending into the opening 190 formed by the bridge 152 and thereby increase or decrease a force applied to the first receptacle of the optical chassis 132.

The azimuth adjustment control 124 engages with the azimuth adjuster assembly 156 via an opening 157 formed in the base 110. The opening 157 in the base 110 may be formed to allow the azimuth adjustment control 124 to engage with azimuth adjuster assembly 156 without interference by the base 110. An operator of the holographic sight 100 may turn the azimuth adjustment control 124, which causes the azimuth adjuster assembly 156 to increase or decrease the length of the assembly extending into the opening 190 formed by the bridge 152 and thereby increase or decrease a force applied to the first receptacle of the optical chassis 132.

The housing 122 may further envelop a printed circuit board assembly 160 comprising electronics configured to power and control the holographic sight 100. A night vision button 162 and up-down buttons 164 may extend through a spacer 166 to engage the printed circuit board assembly 160. The night vision button 162 and the up-down buttons 164 may extend through corresponding openings in the base 110. When an operator of the holographic 100 sight depresses the night vision button 162 and/or the up/down buttons 164, the buttons may interface with the printed circuit board assembly 160 to change the operating characteristics of the holographic sight 100. For example, depressing a particular button or combination of buttons may cause the printed circuit board assembly 160 to change the on/off state, change the brightness of the hologram, and/or toggle between normal and night vision modes.

Figure 3:
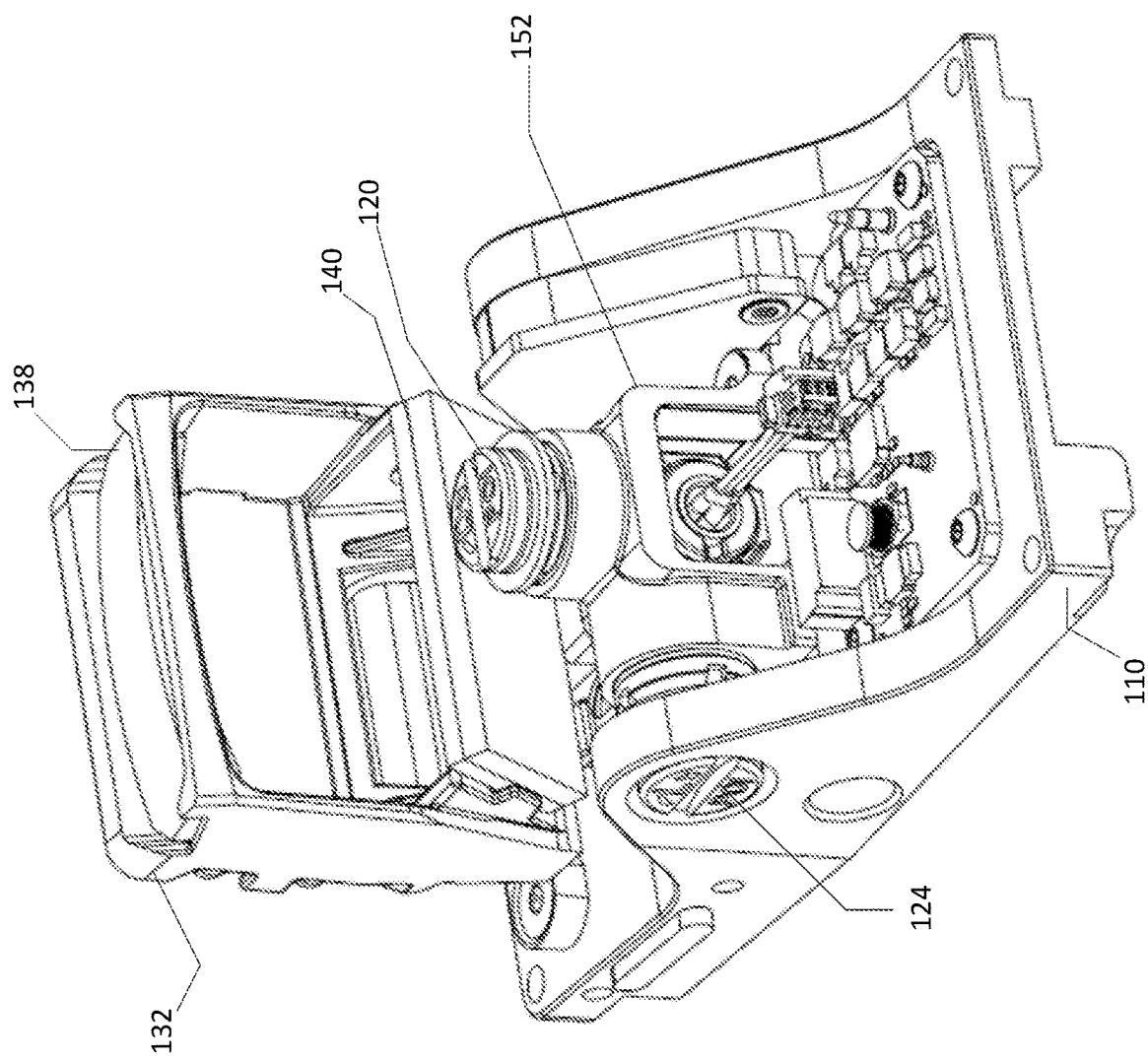
FIG. 3 is a perspective view of an example partially assembled holographic sight.

FIG. 3 depicts a perspective view of the example holographic sight 100 partially assembled with the housing 122, hood 170, and other elements removed. The optical chassis 132 may be mechanically coupled to the base 110 using a suitable fastening technique such as, for example, using screws. The optical components comprising the laser diode 134, the mirror 136, the collimating optic 138, the grating 140, and the image hologram 142 may be received in receptacles of the optical chassis 132. The bridge 152 may be mechanically coupled to the base 110 using a suitable fastening technique such as, for example, using screws. A portion of the optical chassis 132 may extend into an opening 190 defined by the bridge and the base 110. The elevation adjustment control 120 may interface with the elevation adjuster assembly 154 to apply force to a portion of the optical chassis 132 and thereby adjust the elevation of the optical chassis 132. The azimuth adjustment control 124 may interface with the azimuth adjuster assembly 156 to apply force to a portion of the optical chassis 132 and thereby adjust the angular horizontal orientation of the optical chassis 132 relative to the base 110.

Figure 4B:
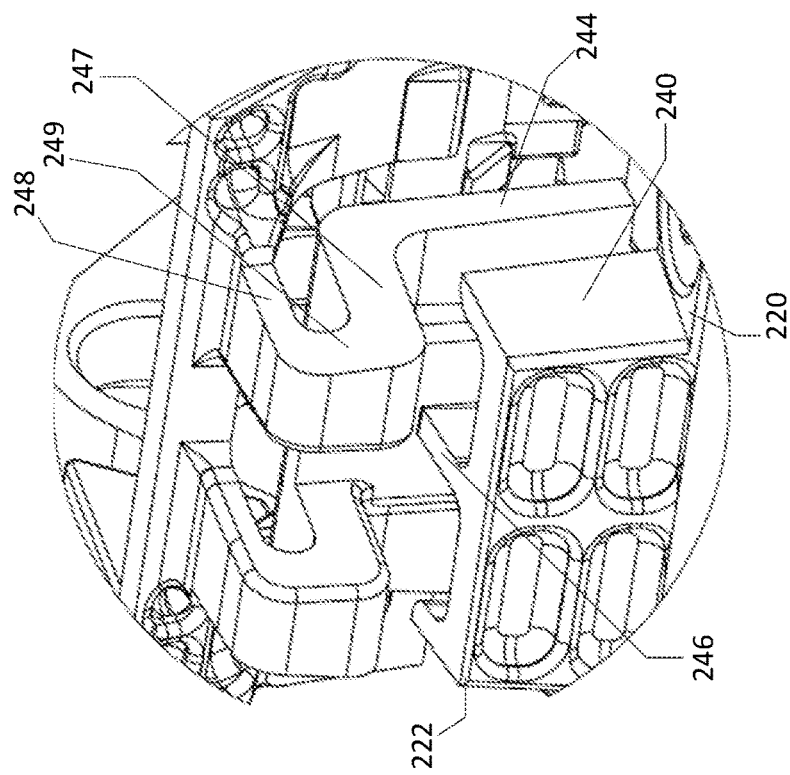
FIG. 4B is a detailed view of a portion of the optical chassis.
Figure 4A:
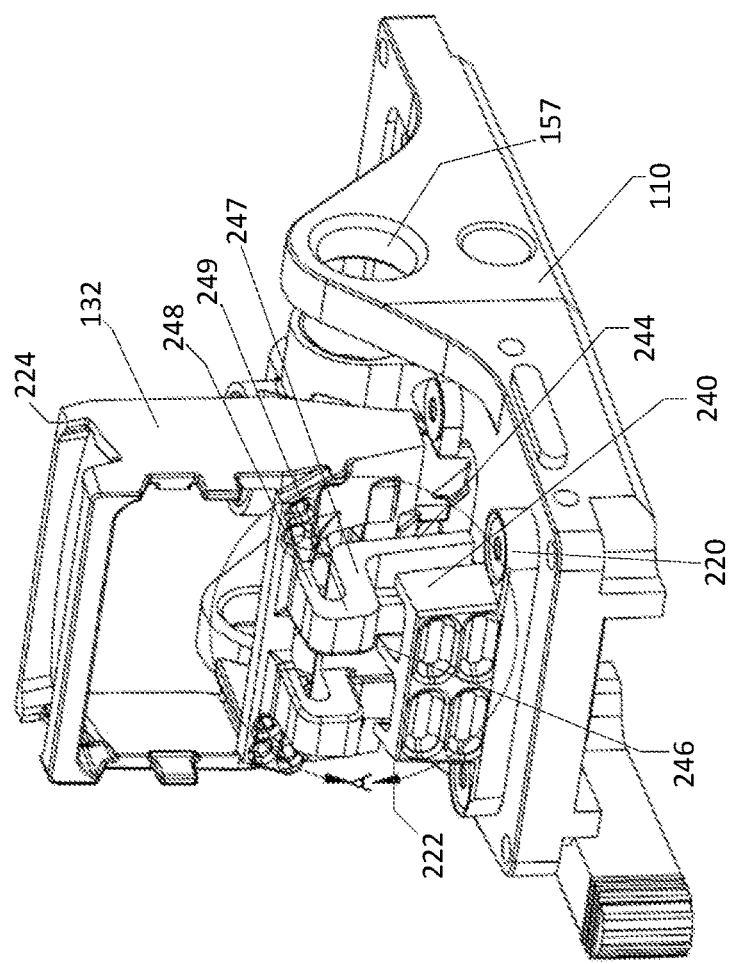
FIG. 4A is a perspective view of an example optical chassis attached to an example base.
Figure 5:
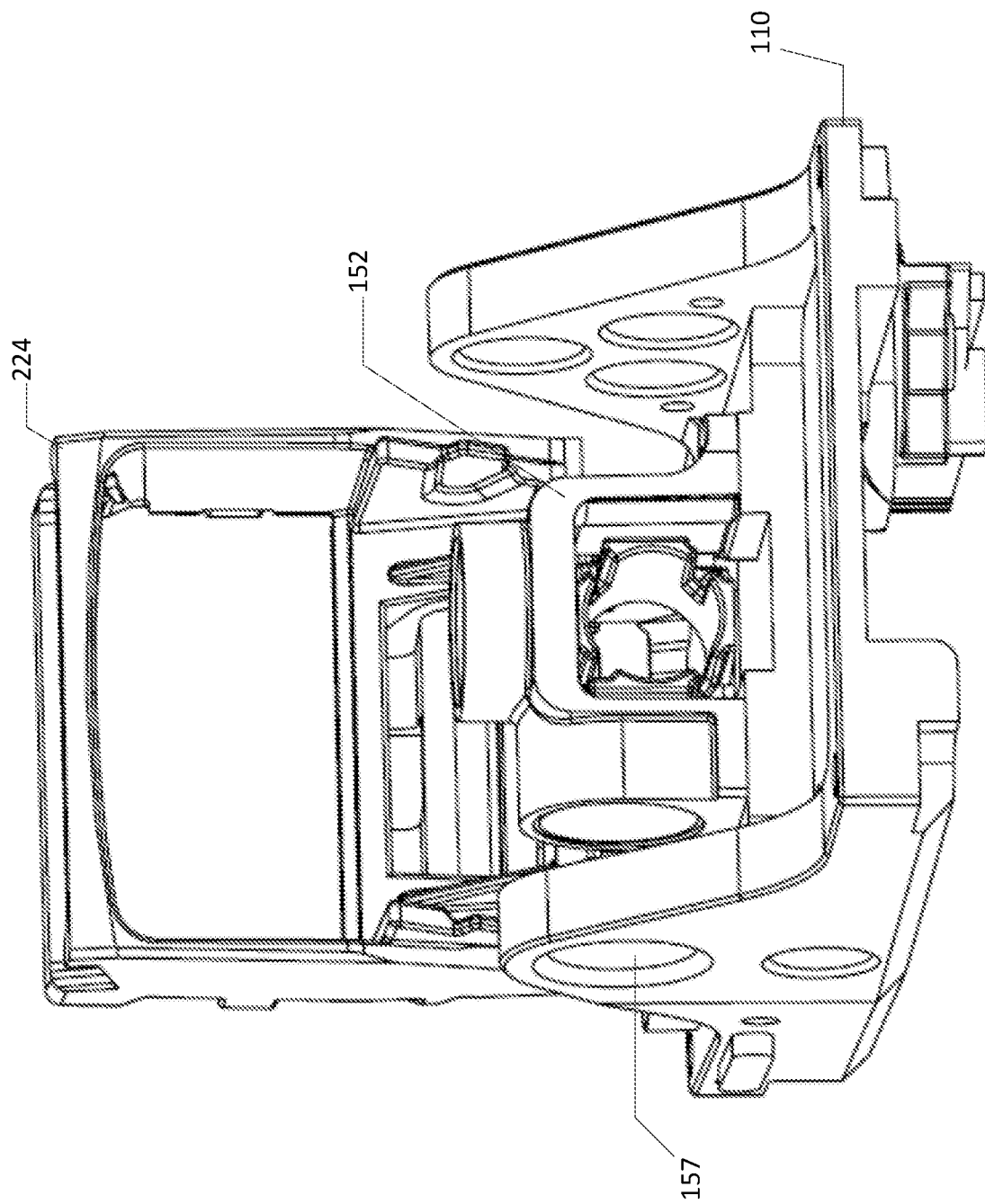
FIG. 5 is a perspective view of an example optical chassis attached to an example base.

FIG. 4A depicts an isolated perspective view of an example optical chassis 132 attached to the base 110 and with the optical components removed. FIG. 4B depicts an enlarged view of a portion of the example optical chassis 132. FIG. 5 depicts a reverse perspective view of the optical chassis 132 attached to the base 110. The optical chassis 132 may comprise an attachment flange 220, a support member 222 integrally formed with the attachment flange 220 and extending upward from the attachment flange 220, and a unitary optical component carrier 224 integrally formed with the support member 222. The attachment flange 220 may be secured to the base 110 using a suitable manner which may comprise, for example, screws that extend through openings in the attachment flange 220 and into corresponding receptacles in the base 110. The support member 222 and the unitary optical component carrier 224 may be suspended relative to the base 110 by the attachment flange 220.

The support member 222 of the optical chassis 132 may comprise one or more portions that are flexible such that the unitary optical component carrier 224 may be angularly moveable in horizontal and/or vertical directions relative to the attachment flange 220 and the base 110. The support member 222 may be compliant so as to allow for adjustment of the position of the unitary optical component carrier 224 relative to the attachment flange 220 and base 110 and thereby allow for adjusting the location of the hologram created in the operator's field of view.

The support member 222 may comprise a first wall 240 extending upward relative to the attachment flange 220 and integrally formed with the attachment flange 220. The support member 222 may further comprise a second wall 244 and a flexible member 246 coupled between the first wall 240 and the second wall 244. The second wall 244 and the flexible member 246 may be supported by the first wall 240. The second wall 244 may be free to angularly move horizontally, with the flexible member 246 as a fulcrum, relative to the attachment flange 220 and base 110. The flexible member 246 may be coupled to the first wall 240 near the center of the first wall 240 and may be coupled to the second wall 244 near the center of the second wall 244. When a horizontal force is applied to the second wall 244, the flexible member 246 may be flexed or twisted allowing the second wall 244 to move or be angularly displaced horizontally relative to the first wall 240 with the flexible member 246 being a fulcrum of the movement. Horizontal force applied to the optical component carrier 224 may be communicated to the second horizontal wall 244 and may result in angular horizontal movement around or about the flexible member 246 of second wall 244 and the optical component carrier 224 relative to the first wall 240 and the attachment flange 220.

The support member 222 may further comprise a first horizontal member 247 integrally formed with the second wall 244 and extending away from the unitary optical component carrier 224, a second horizontal member 248 extending toward the unitary optical component carrier 224, and a joint member 249 integrally formed with the first horizontal member 247 and the second horizontal member 248. The first horizontal member 247, the joint member 249, and the second horizontal member 248 may be integrally formed and together provide vertical flexibility to the unitary optical component carrier 224 relative to the attachment flange 220 and the base 110. The second horizontal member 248 may be flexible in a vertical direction relative to the first horizontal member 247. The joint member 249 may be flexible and allow for vertical movement of the second horizontal member 248 relative to the first horizontal member 247. When vertical pressure is applied to the second horizontal member 248, it may move or be displaced in a vertical direction relative to the first horizontal member 247, the attachment flange 220, and the base 110. The movement may be angular with the joint member 249 serving as a fulcrum. Vertical force applied to the unitary optical component carrier 224 may be communicated to the second horizontal member 248 and result in vertical angular movement or displacement around or about the joint member 249 of the unitary optical component carrier 224 and the second horizontal member 248 relative to the first horizontal member 247 and the attachment flange 220. As illustrated in the FIGs, multiple instances of the first horizontal member 247 and the second horizontal member 248 may be comprised in the support member 222.

Figure 6:
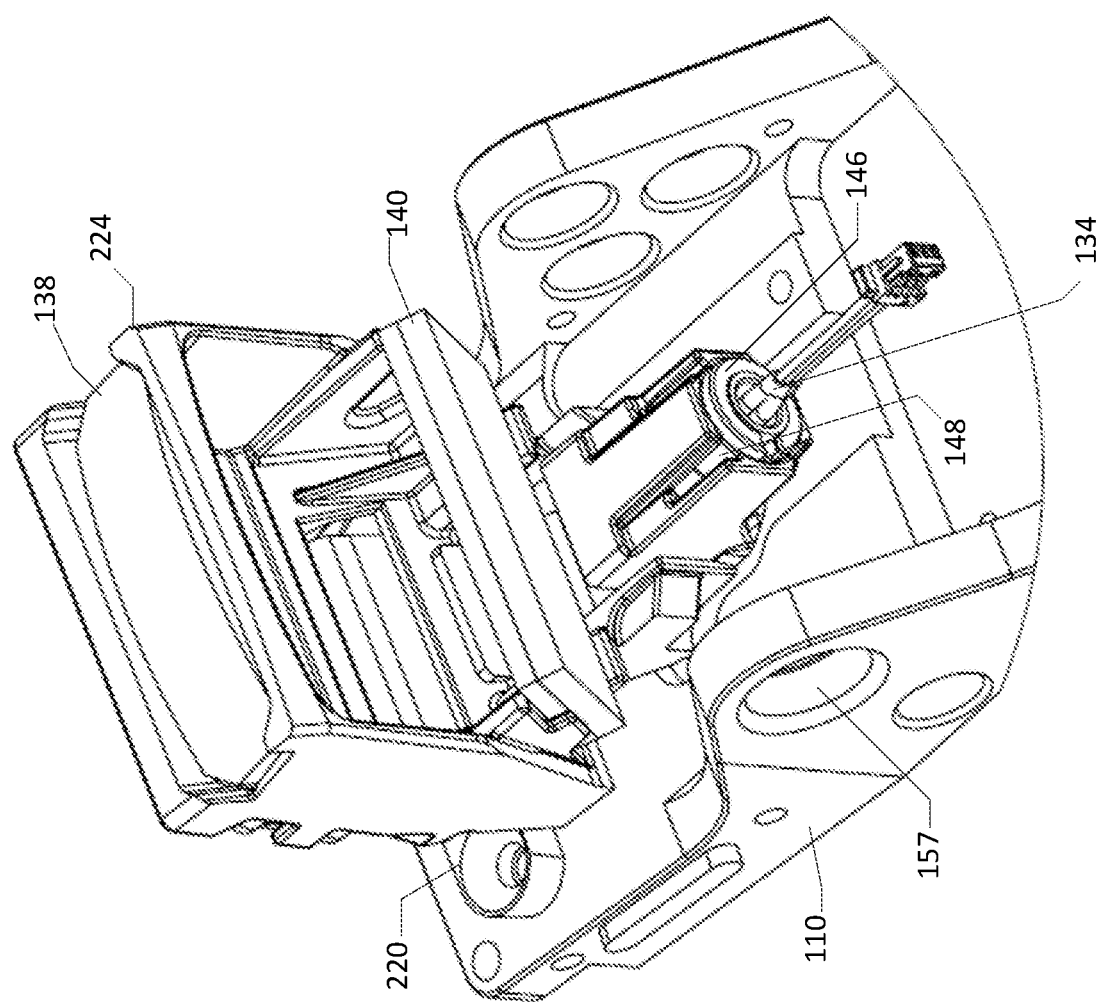
FIG. 6 is a perspective view of an example optical chassis attached to an example base and with optical components attached.
Figure 7:
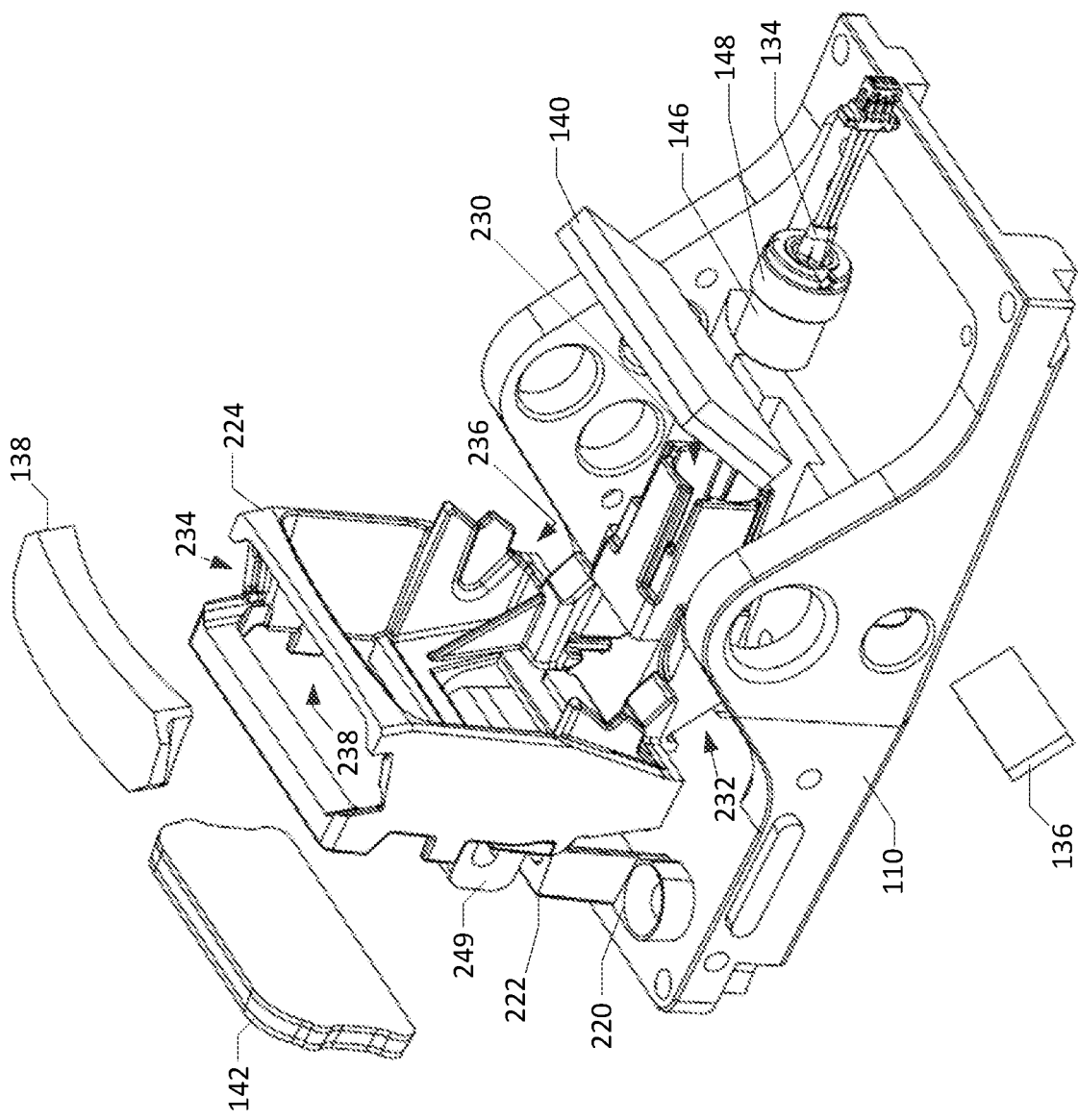
FIG. 7 is a perspective view of an example optical chassis attached to an example base and with optical components exploded.
Figure 8:
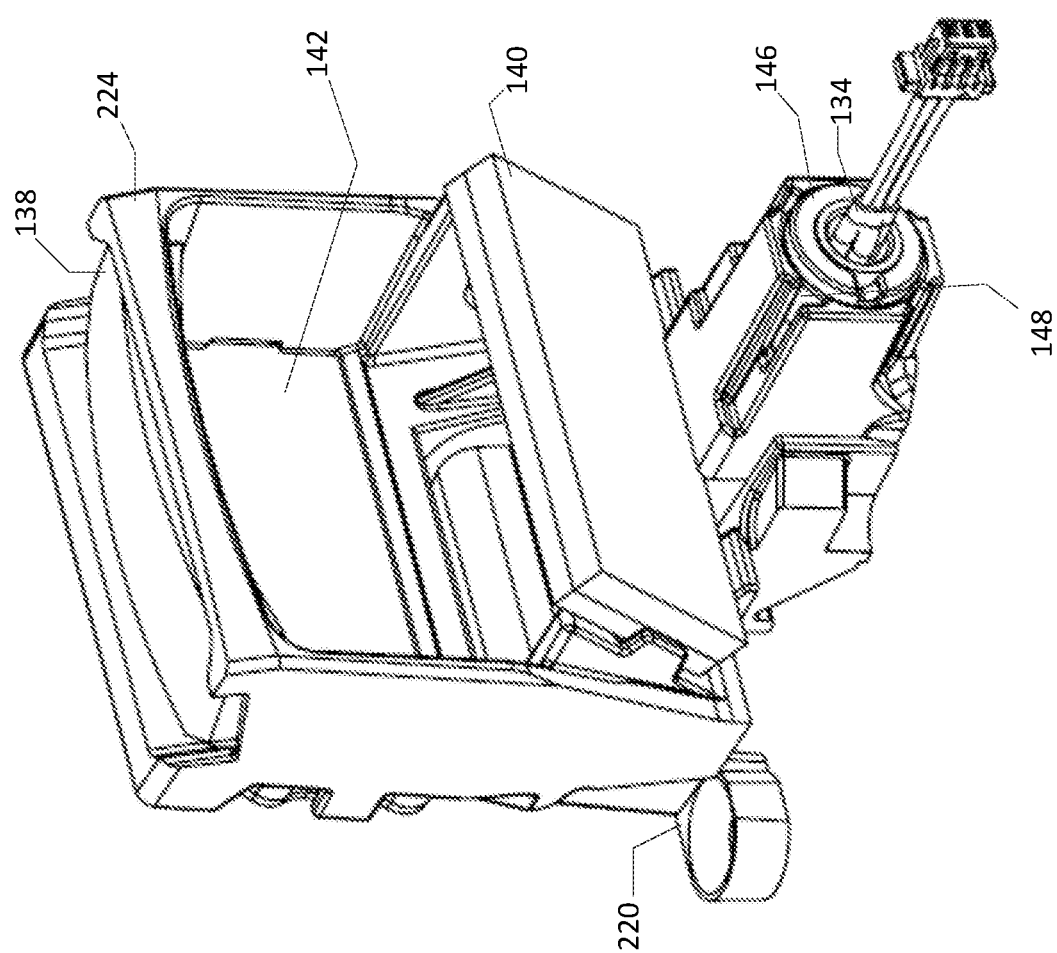
FIG. 8 is a perspective view of an example optical chassis with optical components attached.
Figure 9:
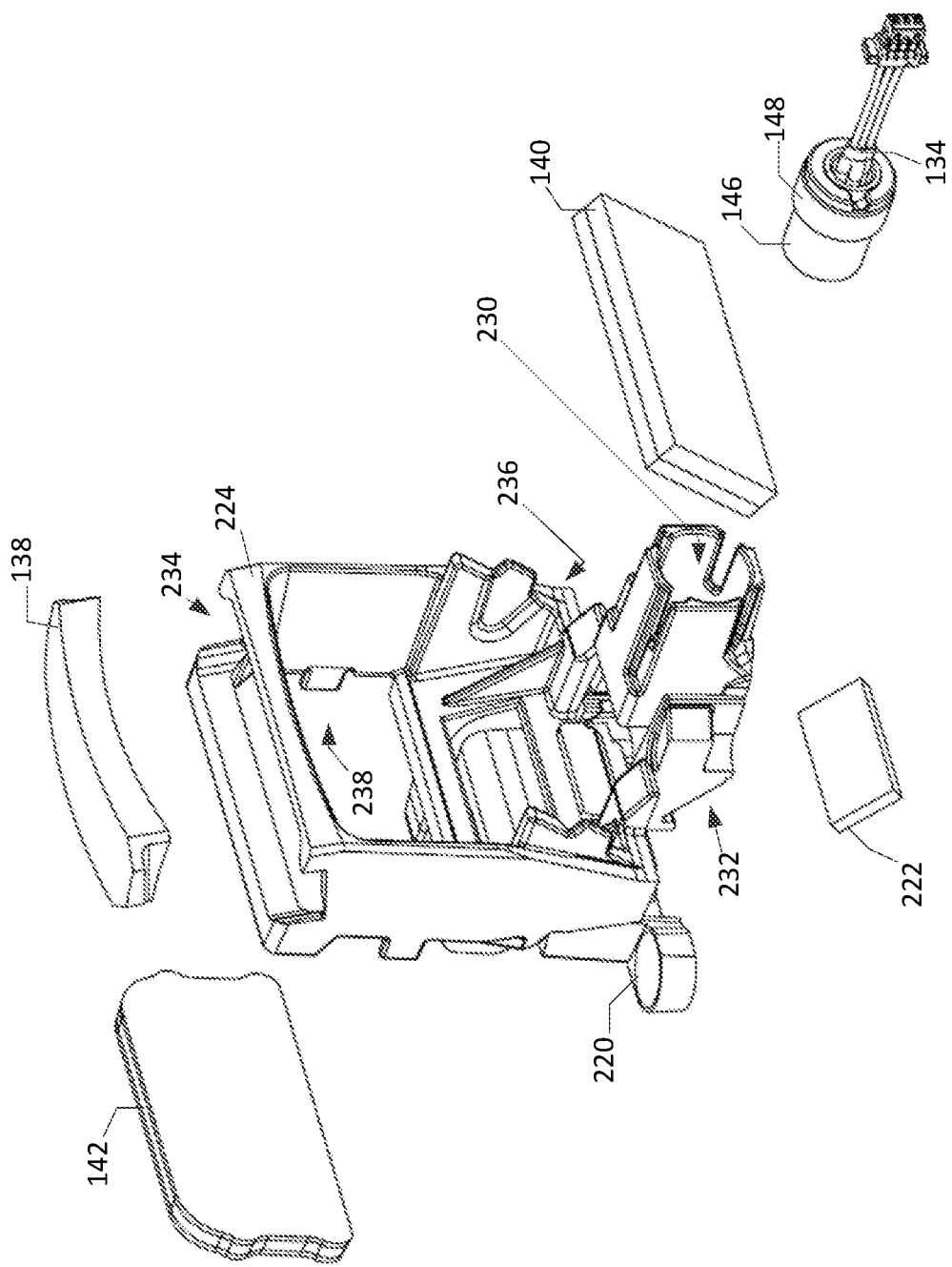
FIG. 9 is a perspective view of an example optical chassis with optical components exploded.

FIG. 6 depicts a perspective view of the example unitary optical component carrier 224 attached to the base 110 and with the optical components 134, 136, 138, 140, and 142 attached. FIG. 7 depicts the example unitary optical component carrier 224 with optical components 134, 136, 138, 140, and 142 exploded. FIG. 8 depicts a perspective view of the example unitary optical component carrier with optical components attached and without the base 110. FIG. 9 depicts the example optical component carrier without the base 110 and with the optical components 134, 136, 138, 140, and 142 exploded. The unitary optical component carrier 224 comprises a body that may serve as a bench or rack to which the optical components are attached. The unitary optical component carrier 224 may be integrally formed with the support member 222 which may be integrally formed with the attachment flange 220. The unitary optical component carrier 224 may comprise a rigid body and may be substantially resistant to changes in relative distances between the optical components. For example, in a scenario wherein forces are applied to the first receptacle 230 by elevation adjuster assembly 154 and/or by the azimuth adjuster assembly 156, the unitary optical component carrier 224 may be resistant to distortion and may move substantially in unison with the relative distances between the optical components 134, 136, 138, 140, and 142 remaining substantially unchanged. The unitary optical component carrier 224 may be made from a material that has a relatively low coefficient of thermal expansion. As a result, the relative distance between the optical components may remain substantially the same over a wide spectrum of temperature environments. In an example, unitary optical component carrier 224 may be manufactured from titanium.

The unitary optical component carrier 224 may comprise a plurality of receptacles 230, 232, 234, 236, 238 configured to receive optical components. Each of the receptacles 230, 232, 234, 236, and 238 comprises one or more surfaces configured to receive corresponding surfaces of the appropriate optical components. The surface to surface mounting results in precise locating of the optical components relative to the unitary optical component carrier 224 and to each other. The receptacles 230, 232, 234, 236, and 238 are configured to allow the corresponding optical components to be applied from the exterior of the unitary optical component carrier 224. Mounting of the optical components from the exterior may be performed by an automated means such as, for example, by robotic handling. The optical components may be secured in the receptacles 230, 232, 234, 236, and 238 via friction between the optical components and the corresponding receptacle and/or by application of an adhesive.

Figure 10:
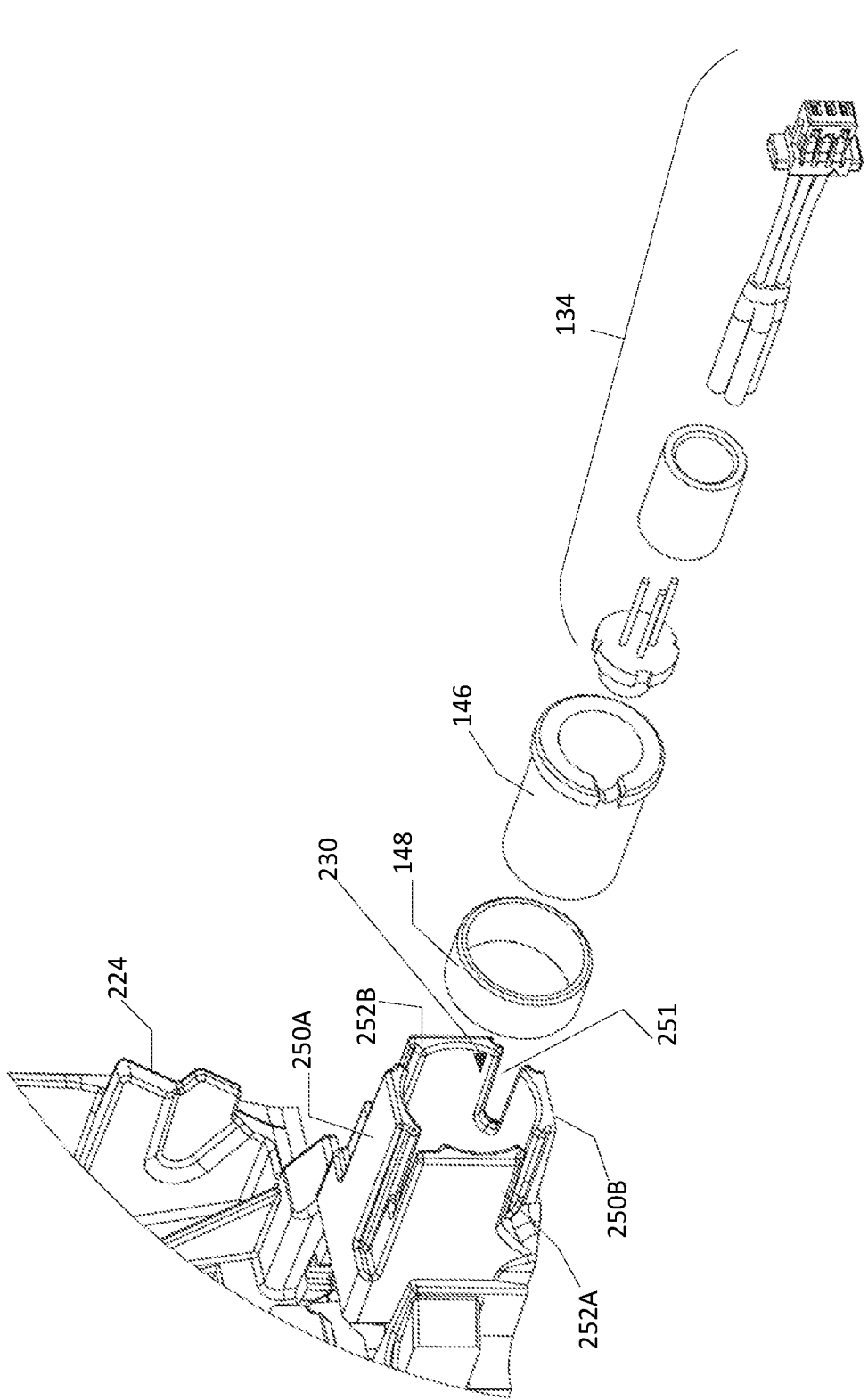
FIG. 10 is a perspective view of a portion of an example optical chassis configured to receive a laser diode.

FIG. 10 depicts an isolated view of an example first receptacle 230 of an example unitary optical component carrier 224 with the laser diode 134, the collar 146, and the ring 148 aligned for insertion into the first receptacle. The first receptacle 230 may comprise a first set of opposing side walls 250A and 250B and a second set of opposing side walls 252A and 252B. The first set of opposing side walls 250A and 250B and the second set of opposing side walls 252A and 252B form a receptacle for receiving the laser diode 134. Openings 251 may be formed between adjacent sidewalls 250 and 252 which may allow opposing side walls 250A and B to be flexed apart from each other. The external surfaces of the sidewalls 250A, B and the sidewalls 252A, B may be substantially flat or planar and configured to receive forces. For example, the sidewall 250A may comprise a substantially flat or planar external surface and may be abutted by a projection from elevation adjustment assembly 154. The projection of the elevation adjustment assembly 154 may apply a force in a vertical direction relative to the attachment flange 220 and the base 110. The sidewall 252A may comprise a substantially flat or planar external surface and may be abutted by a projection from the azimuth adjuster assembly 156. The projection of the azimuth adjuster assembly 156 may apply a force in a horizontal direction relative to the attachment flange 220 and the base 110.

The laser diode 134, which may comprise a plurality of component parts, may be positioned within the collar 146. The collar 146 may be formed in a substantially cylindrical shape with an interior surface and an external surface. The interior surface of the collar 146 may be sized to receive and form a frictional interference fit with the laser diode 134. The ring 148 may also be formed in a substantially cylindrical shape with an interior surface and an external surface. The interior surface of the ring 148 may be sized and shaped to form a frictional interference fit with the external surface of the collar 146. The assembled combination of the diode 146, the collar 146, and the ring 148 may be inserted into the receptacle 230. The assembled diode 146, collar 146, and ring 148 may be inserted by applying a force to the collar 146 using a tool such as insertion tool that may be configured to apply a force to the collar 146 without applying a force to the laser diode 134.

The external surface of the ring 148 may form a frictional interference fit with internal sides of opposing side walls 250A, B and 252A, B. The external diameter of the ring 148 may be larger than the opening formed by the opposing side walls 250A,B and 252A, B. Accordingly, the opposing side walls 250A, B and 252A, B may flex outward to accommodate ring 148.

Figure 11:
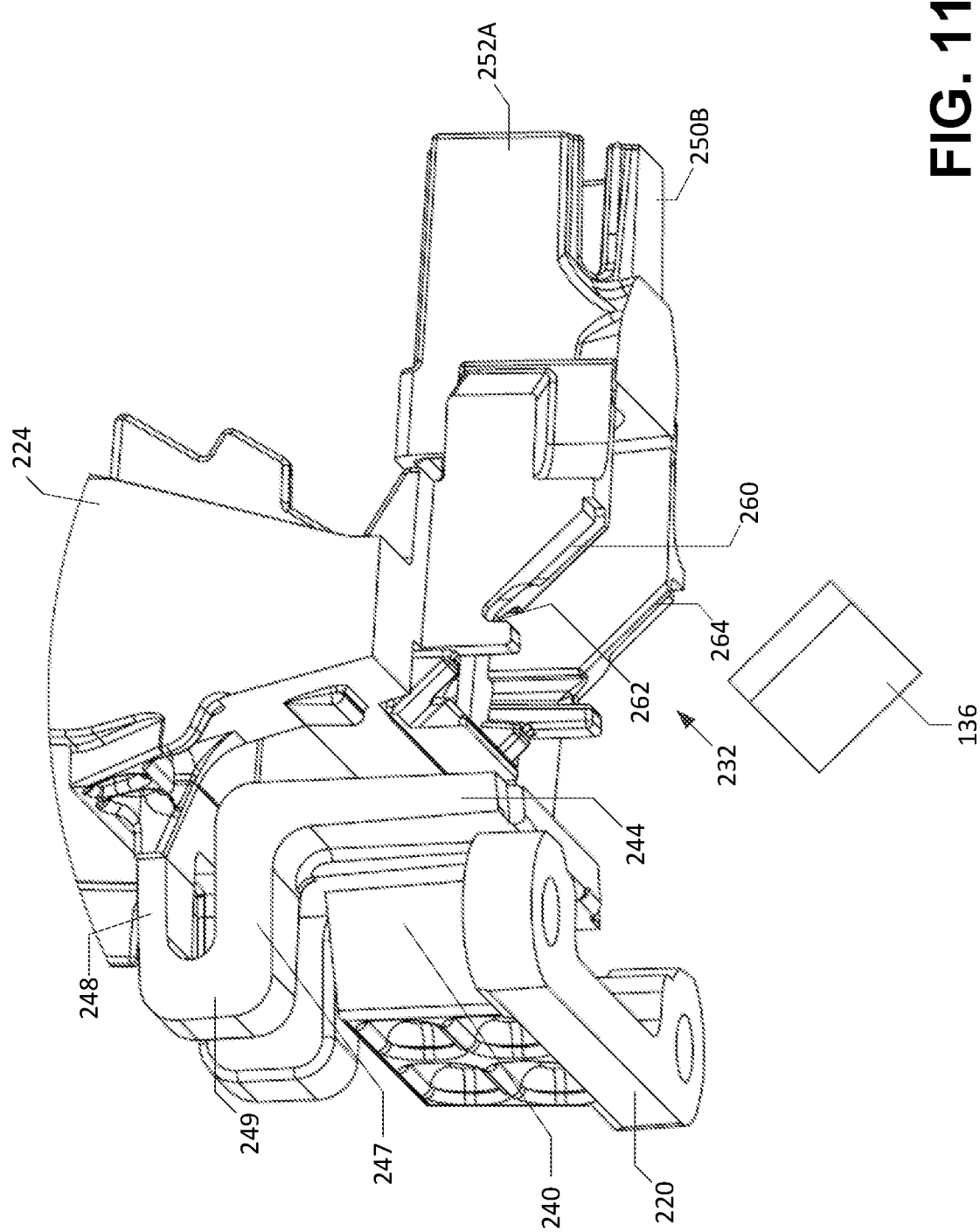
FIG. 11 is a perspective view of a portion of an example optical chassis configured to receive a mirror.

FIG. 11 depicts an isolated view of an example second receptacle 232 of an example unitary optical component carrier 224 with the mirror 136 aligned for insertion into the second receptacle 232. The second receptacle 232 may comprise a plurality of surfaces, which may be referred to as datums, that are configured to abut corresponding surfaces of the mirror 136. For example, the second receptacle 232 may comprise a first surface 260, a second surface 262, and a third surface 264 against which corresponding surfaces of the mirror may abut. The first surface 260, the second surface 262, and the third surface 264 may be positioned relative to each other so as to limit the movement of the mirror 136 in two or more dimensions and thereby provide relatively precise location of the mirror 136 relative to the unitary optical component carrier 224. An adhesive such as, for example, a glue or cement substance, may be applied to the surfaces 260, 262, and 264 of the second receptacle 232 and/or the corresponding surfaces of the mirror 136 that abut the surfaces of the second receptacle 232.

Figure 12:
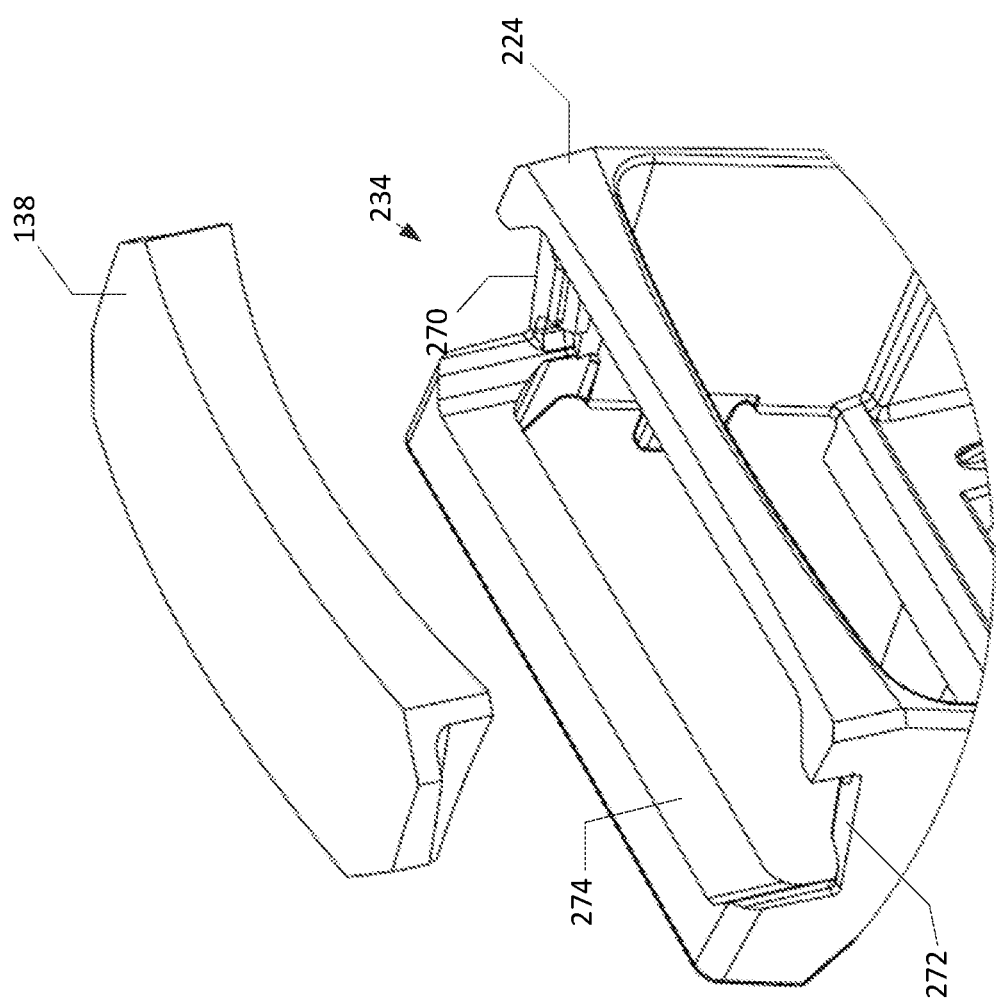
FIG. 12 is a perspective view of a portion of an example optical chassis configured to receive a collimating optic.

FIG. 12 depicts an isolated view of an example third receptacle 234 of an example unitary optical component carrier 224 with a collimating optic 138 aligned for insertion into the third receptacle 234. The third receptacle 234 may comprise a plurality of surfaces or datums that are configured to abut corresponding surfaces of the collimating optic 138. For example, the third receptacle 234 may comprise a first surface 270, a second surface 272, and a third surface 274 against which corresponding surfaces of the collimating optic 138 may abut. The first surface 270, the second surface 272, and the third surface 274 may be positioned relative to each other so as to limit the movement of the collimating optic 138 in two or more dimensions and thereby provide relatively precise location of the collimating optic 138 relative to the unitary optical component carrier 224. An adhesive such as, for example, a glue or cement substance, may be applied to the surfaces 270, 272, and 274 of the third receptacle 234 and/or the corresponding surfaces of the collimating optic 138 that abut the surfaces of the third receptacle 234.

Figure 13:
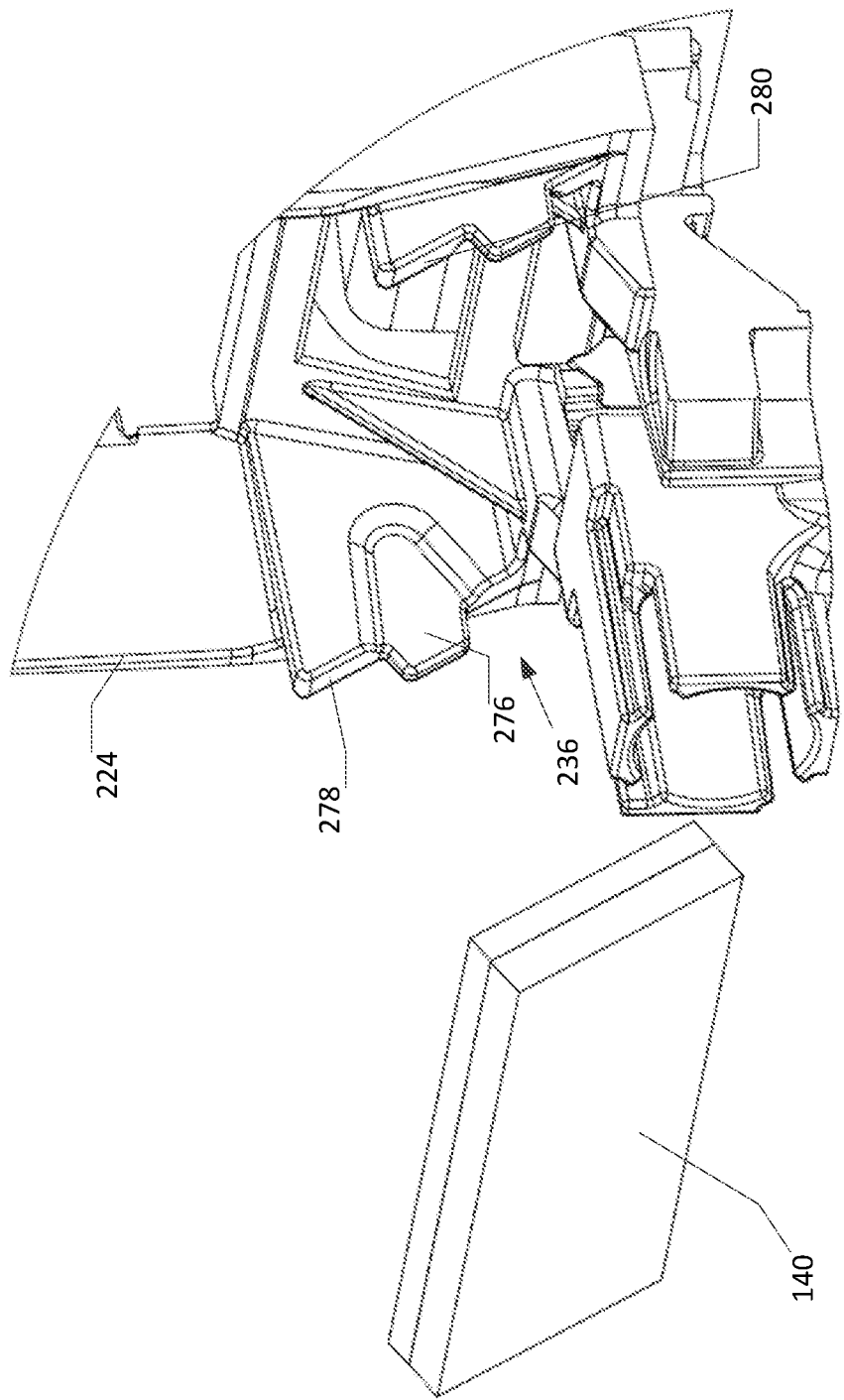
FIG. 13 is a perspective view of a portion of an example optical chassis configured to receive a grating.

FIG. 13 depicts an isolated view of an example fourth receptacle 236 of an example unitary optical component carrier 224 with a grating 140 aligned for insertion into the fourth receptacle 236. The grating 140 may be, for example, a diffraction grating such as, for example, a holographic grating. The fourth receptacle 236 may comprise a plurality of surfaces or datums that are configured to abut corresponding surfaces of the grating 140. For example, the fourth receptacle 236 may comprise a first surface 276, a second surface 278, and a third surface 280 against which corresponding surfaces of the mirror may abut. The first surface 276, the second surface 278, and the third surface 280 may be positioned relative to each other so as to limit the movement of the grating 140 in two or more dimensions and thereby provide relatively precise location of the grating 140 relative to the unitary optical component carrier 224. An adhesive such as, for example, a glue or cement substance, may be applied to the surfaces 276, 278, and 280 of the fourth receptacle 236 and/or the corresponding surfaces of the grating 140 that abut the surfaces of the fourth receptacle 236.

Figure 14:
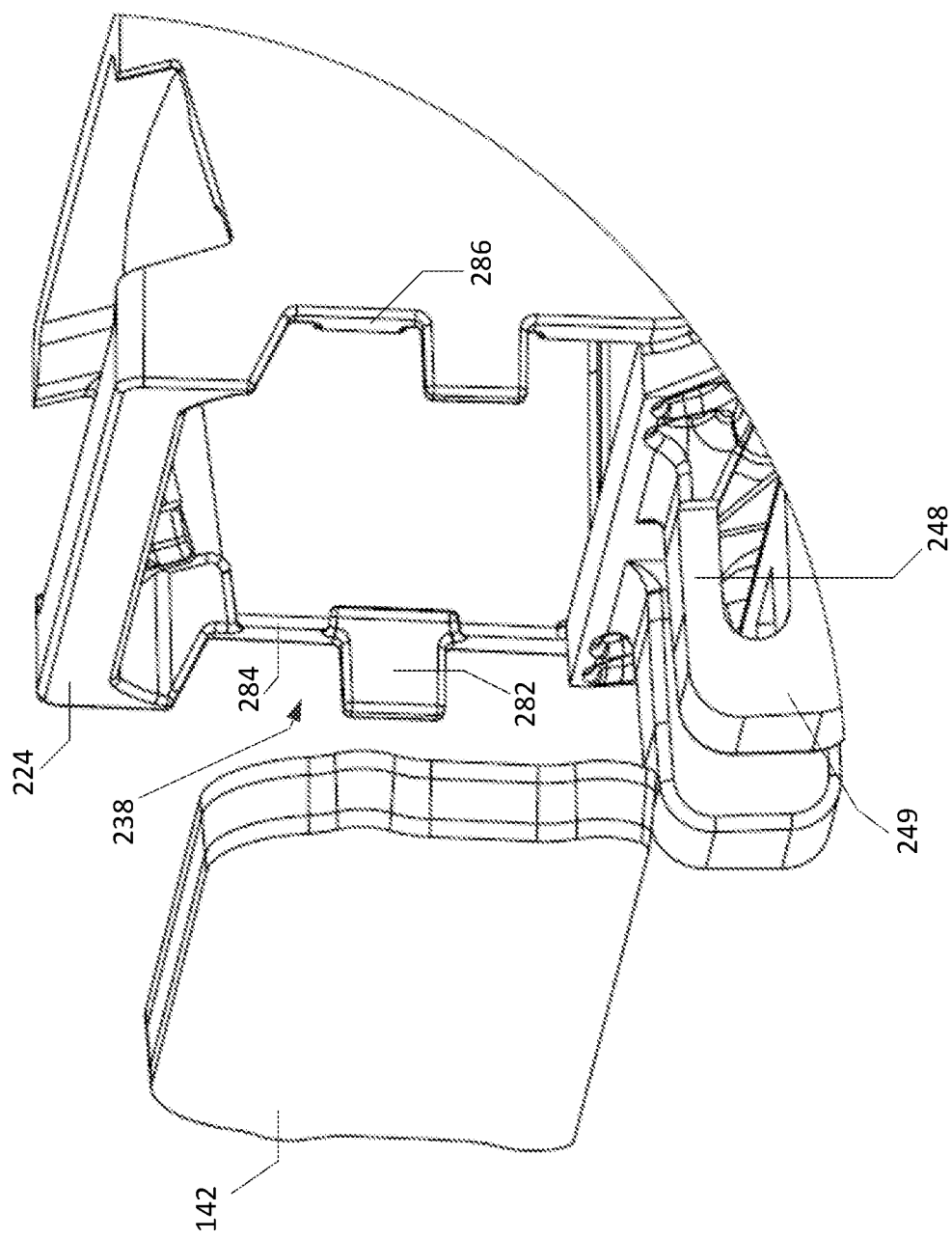
FIG. 14 is a perspective view of a portion of an example optical chassis configured to receive an image hologram.

FIG. 14 depicts an isolated view of an example fifth receptacle 238 of an example unitary optical component carrier 224 with an image hologram 142 aligned for insertion into the fifth receptacle 238. The fifth receptacle 238 may comprise a plurality of surfaces or datums that are configured to abut corresponding surfaces of the image hologram 142. For example, the fifth receptacle 238 may comprise a first surface 282, a second surface 284, and a third surface 286 against which corresponding surfaces of the image hologram 142 may abut. The first surface 282, the second surface 284, and the third surface 286 may be positioned relative to each other so as to limit the movement of the image hologram 142 in two or more dimensions and thereby provide relatively precise location of the image hologram 142 relative to the unitary optical component carrier 224. An adhesive such as, for example, a glue or cement substance, may be applied to surfaces 282, 284, and 286 of the fifth receptacle 238 and/or the corresponding surfaces of the image hologram 142 that abut the surfaces of the fifth receptacle 238.

Accordingly, Applicant has disclosed a holographic sight comprising a unitary optical component carrier. The unitary optical component carrier may comprise a first receptacle configured to receive a laser diode, a second receptacle configured to receive a mirror, a third receptacle configured to receive a collimating optic, a fourth receptacle configured to receive a grating, and a fifth receptacle configured to receive an image hologram. The unitary optical component carrier provides mechanical stability and maintains the relative positioning of the optical components applied to it.

Accordingly, Applicant has disclosed a holographic sight comprising a unitary optical component carrier. The unitary optical component carrier may comprise a plurality of receptacles that are configured to receive optical components therein. The unitary optical component carrier may be mechanically rigid, and the optical components received therein may be maintained in their intended relative positions. Displacement of the optical components due to movement of separate receiving structures is eliminated. To the extent the unitary optical component carrier may be displaced, the rigidity of the unitary optical component carrier causes all the components to be displaced and the relative position of the optical components to be maintained. The unitary optical component carrier may be made of a material that has a low coefficient of thermal expansion (CTE) and may, therefore, be resistant to displacement of the optical components due to changes in temperature. A holographic sight comprising the unitary optical component carrier offers improved ease of assembly and greater operational accuracy across a wide spectrum of operating environments.

It will be appreciated that while illustrative embodiments have been disclosed, the scope of potential embodiments is not limited to those explicitly described. For example, while an example holographic sight is described with a particular number of optical components, different numbers of optical components may be comprised in a holographic sight consistent with the disclosure. Embodiments may have optical components arranged in formations other than as in the examples described herein. Likewise, embodiments may employ support members that provide similar functionality, but which are configured differently than as explicitly described herein.

Although the features and elements may be described herein in particular combinations, each feature or element may be used alone, without the other features and elements, and/or in various combinations with or without other features and elements.

What is claimed:
1. A holographic sight comprising:
a base;
a support member coupled with the base and extending upward from the base;
a unitary optical component carrier integrally formed with the support member, the unitary optical component carrier comprising a first receptacle configured to receive a laser diode, a second receptacle configured to receive a mirror, a third receptacle configured to receive a collimating optic, a fourth receptacle configured to receive a diffraction grating, and a fifth receptacle configured to receive an image hologram; and an adjuster assembly coupled with the base and configured to apply a force to the unitary optical component carrier, wherein, in response to the force applied to the unitary optical component carrier by the adjuster assembly, the support member is configured to flex and the unitary optical component carrier is configured to angularly move relative to the base about the flexure of the support member, and wherein the unitary optical component carrier comprises a single body that provides the first, second, third, fourth, and fifth receptacles and is resistant to changes in relative distance between the first, second, third, fourth, and fifth receptacles in response to the force applied to the unitary optical component carrier by the adjuster assembly.

2. The holographic sight of claim 1, wherein angular movement of the unitary optical component carrier relative to the base is configured to adjust the location of a hologram image generated by the laser diode and projected in a viewing area of the holographic sight.

3. The holographic sight of claim 1, wherein the support member comprises a first support member portion extending upward relative to the base, a second support member portion extending away from the unitary optical component carrier, and a third support member portion extending toward the unitary optical component carrier, the third support member portion integrally formed with the unitary optical component carrier.

4. The holographic sight of claim 3, wherein the first support member portion is flexible and the unitary optical component carrier angularly moveable, with the first support member portion as a fulcrum, in a horizontal direction relative to the base.

5. The holographic sight of claim 4, wherein the third support member portion is flexible and the unitary optical component carrier moveable in a vertical direction relative to the base.

6. The holographic sight of claim 1, wherein the first receptacle configured to receive a laser diode comprises a first set of opposing walls and a second set of opposing walls, the first set of opposing walls and the second set opposing side walls forming an opening configured to receive a laser diode.

7. The holographic sight of claim 6, wherein the opening configured to receive a laser diode is configured to receive a cylindrical collar in which the laser diode is positioned.

8. The holographic sight of claim 7, wherein the first set of opposing walls and the second set of opposing walls have recesses formed between, the opposing walls configured to flex outward to accommodate the cylindrical collar.

9. The holographic sight of claim 8, wherein an external side of at least one of the first set of opposing walls is substantially flat and configured to receive a force from the adjuster assembly in a horizontal direction relative to the base.

10. The holographic sight of claim 8, wherein an external side of at least one of the second set of opposing walls is substantially flat and configured to receive a force from the adjuster assembly in a vertical direction relative to the base.

11. The holographic sight of claim 1, wherein the second receptacle configured to receive a mirror comprises at least first surface and a second surface configured to abut surfaces of a mirror.

12. The holographic sight of claim 1, wherein the third receptacle configured to receive a collimating optic comprises at least a first surface and a second surface configured to abut surfaces of a collimating optic.

13. The holographic sight of claim 1, wherein the fourth receptacle configured to receive a diffraction grating comprises at least a first surface and a second surface configured to abut surfaces of a diffraction grating.

14. The holographic sight of claim 1, wherein the fifth receptacle configured to receive an image hologram comprises at least a first surface and a second surface configured to abut surfaces of a diffraction grating.

15. A holographic sight comprising:
a base;
an adjuster assembly coupled with the base;
a unitary optical component carrier coupled with the base and comprising a first receptacle configured to receive a laser diode, a second receptacle configured to receive a mirror, a third receptacle configured to receive a collimating optic, a fourth receptacle configured to receive a diffraction grating, and a fifth receptacle configured to receive an image hologram, wherein the unitary optical component carrier comprises a single rigid body that defines the first, second, third, fourth, and fifth receptacles and that is configured to be substantially resistant to changes in relative distances between optical components received at the first, second, third, fourth, and fifth receptacles; and a support member integrally formed with the unitary optical component carrier, the support member comprising a first portion that is flexible in a horizontal direction and a second portion that is flexible in vertical direction, the unitary optical component carrier horizontally and vertically moveable relative to the support member, wherein, in response to a horizontal force applied to the unitary optical component carrier by the adjuster assembly, the first portion of the support member is configured to flex in the horizontal direction to angularly move the unitary optical component carrier horizontally relative to the base about the flexure of the first portion of the support member, and wherein, in response to a vertical force applied to the unitary optical component carrier by the adjuster assembly, the second portion of the support member is configured to flex in the vertical direction to angularly move the unitary optical component carrier vertically relative to the base about the flexure of the second portion of the support member.

16. The holographic sight of claim 15,
wherein the support member comprises a first upstanding wall, a second upstanding wall, and a flexible member connected between the first upstanding wall and the second upstanding wall, the unitary optical component carrier integrally formed with the second upstanding wall, wherein a horizontal force applied to the unitary optical component carrier is communicated to the second upstanding wall and angularly displaces in a horizontal direction, with the flexible member as a fulcrum, the second upstanding wall and the unitary optical component carrier.

17. The holographic sight of claim 15,
wherein the support member comprises a first horizontal member, a second horizontal member, and a joint integrally formed between the first horizontal member and the second horizontal member, the unitary optical component carrier integrally formed with the second horizontal member, wherein a vertical force applied to the unitary optical component carrier is communicated to the second horizontal member and angularly displaces in a vertical direction, with the joint as a fulcrum, the second horizontal member and the unitary optical component carrier.

18. A holographic sight comprising:

a base;

an adjuster assembly coupled with the base;

a support member coupled with the base; and a unitary optical component carrier integrally formed with the support member and comprising a first receptacle configured to receive a laser diode, a second receptacle configured to receive an image hologram, and at least a third receptacle configured to receive at least one optical device configured to communicate light between the laser diode and the image hologram, wherein the unitary optical component carrier comprises a single body that defines the first, second, third, fourth, and fifth receptacles and that is configured to be substantially resistant to changes in relative distances between optical components received at the first, second, third, fourth, and fifth receptacle, wherein the single body of the unitary optical is formed from a metal that has a low coefficient of thermal expansion relative to other metals, and wherein, in response to a force applied to the unitary optical component carrier by the adjuster assembly, the support member is configured to flex to angularly move the unitary optical component carrier relative to the base about the flexure of the support member.

19. The holographic sight of claim 18, wherein the at least a third receptacle comprises:

a third receptacle configured to receive a mirror;

a fourth receptacle configured to receive a collimating optic, and a fifth receptacle configured to receive a diffraction grating.

20. The holographic sight of claim 18, wherein, in response to a vertical force applied to the unitary optical component carrier by the adjuster assembly, the unitary optical component carrier is angularly moveable around the support member in a vertical directions relative to the base.

* * * * *